United States Patent [19]

Ratko et al.

[11] Patent Number: 5,422,160
[45] Date of Patent: Jun. 6, 1995

[54] SOFTGEL CAPSULE WITH A PATTERNED OUTER SHELL SURFACE

[75] Inventors: Michael Ratko, Windsor; Ovila Bezaire, Kingsville; Robert Morissette, Windsor, all of Canada; Edward A. Mendelin, deceased, late of Calumet, Mich., by Tony Mendelin legal representative; Daniel A. Tedder, deceased, late of Pleasant Garden, N.C., by John H. Kornegay, legal representative

[73] Assignee: R. P. Scherer Corporation, Troy, Mich.

[21] Appl. No.: 121,950

[22] Filed: Sep. 15, 1993

Related U.S. Application Data

[63] Continuation of Ser. No. 765,418, Sep. 25, 1991, abandoned, which is a continuation of Ser. No. 645,307, Jan. 24, 1991, abandoned, which is a continuation of Ser. No. 302,424, Jan. 26, 1989, abandoned.

[51] Int. Cl.$^6$ .................................................. A61J 3/07
[52] U.S. Cl. .................................... 428/141; 424/467; 424/451; 424/456; 424/463; 428/34.8; 428/35.2; 428/76
[58] Field of Search ............... 428/35.2, 34.8, 76, 428/141; 424/467, 451, 456, 463

[56] References Cited

U.S. PATENT DOCUMENTS

| | | | |
|---|---|---|---|
| 2,152,101 | 3/1939 | Scherer | 53/451 |
| 2,205,837 | 6/1940 | Ravenscroft et al. | 264/4 |
| 2,219,537 | 10/1940 | Pittenger | 24/196 |
| 2,345,674 | 4/1944 | Kath | 264/145 |
| 2,449,139 | 9/1948 | Posner | 425/307 |
| 2,555,369 | 6/1951 | Politt et al. | |
| 2,623,494 | 12/1952 | Scherer et al. | 101/35 |
| 2,688,775 | 7/1954 | Scherer et al. | 264/293 |
| 2,703,047 | 3/1955 | Scherer et al. | 264/293 |
| 2,775,447 | 12/1956 | Stirn et al. | 270/52 |
| 2,927,345 | 3/1960 | Hansen et al. | 425/224 |
| 2,928,128 | 3/1960 | Carlson et al. | 156/243 |
| 3,124,840 | 3/1964 | Taylor et al. | 425/134 |
| 3,203,347 | 8/1965 | Hansen et al. | 101/350 |
| 3,333,031 | 7/1967 | Vincent, Jr. et al. | 264/15 |
| 3,374,303 | 3/1968 | Metz | 264/216 |
| 3,436,453 | 4/1969 | Vincent, Jr. et al. | 424/467 |
| 4,028,024 | 6/1977 | Moreland | 425/296 |
| 4,215,104 | 7/1980 | Ullman et al. | 424/467 |
| 4,428,927 | 1/1984 | Ebert et al. | 424/456 |
| 4,532,126 | 7/1985 | Ebert et al. | 424/456 |
| 4,609,403 | 9/1986 | Wittwer et al. | 424/456 |
| 4,719,112 | 1/1988 | Mayer et al. | 424/456 |
| 4,735,805 | 5/1988 | Ni et al. | 424/467 |

FOREIGN PATENT DOCUMENTS

| | | |
|---|---|---|
| 2270602A | 12/1986 | European Pat. Off. |
| 615056 | 7/1987 | Japan . |
| 27191982 | 2/1982 | Rep. of Korea . |
| 758642 | 10/1956 | United Kingdom . |
| WO8700817 | 2/1987 | WIPO . |

OTHER PUBLICATIONS

Stanley, J. P., *The Theory and Practice of Indsutrial Pharmacy*, "Capsules, Soft Gelatin Capsules," Ch. 13, II, pp. 360-384, (1970: Philadelphia, Pa.).

*Primary Examiner*—A. A. Turner
*Attorney, Agent, or Firm*—Allegretti & Witcoff, Ltd.

[57] ABSTRACT

A softgel having a texture on at least a portion of its surface and a process and apparatus for the manufacture thereof. The process for manufacturing the textured softgel includes forming a flowable gelatin mass, providing a rotary drum having an outer surface, controllably directing a flowable gelatin mass to the outer surface of the drum, forming a gelatin ribbon of substantially uniform thickness on the outer surface of the drum, the gelatin ribbon being initially in a relatively softer and moldable state immediately following the directing step, providing a roller of reduced diameter with a textured surface closely adjacent to the outer surface of the drum, passing the ribbon while in the relatively softer and moldable state between the drum surface and the textured surface while applying sufficient pressure to the roller in the direction towards the drum to cause the textured surface to impart a matching texture on the other surface of the ribbon, providing a second gelatin ribbon, forming a plurality of filled softgels from the gelatin ribbons, the matching texture defining the outer surface of at least of a portion of each of the softgels.

5 Claims, 3 Drawing Sheets

SOFTGEL CAPSULE WITH A PATTERNED OUTER SHELL SURFACE

This application is a continuation of prior application Ser. No. 07/765,418, filed Sep. 25, 1991, now abandoned, which is a continuation application of prior application Ser. No. 07/645,307 filed Jan. 24, 1991, now abandoned, which is a continuation application of prior application Ser. No. 07/302,424 filed Jan. 26, 1989, now abandoned.

BACKGROUND OF THE INVENTION

Field of the Invention and Description of the Prior Art

This invention relates to textured softgels (or soft gelatin capsules) and to a process and apparatus for the manufacture thereof.

Soft gelatin capsules, now more commonly known as softgels, have been well known and widely used for many years. Softgels generally comprise an outer shell primarily made of gelatin, a plasticizer, and water, and a fill contained within the shell. The fill may be selected from any of a wide variety of substances that are compatible with the gelatin shell. Softgels are widely used in the pharmaceutical industry as an oral dosage form containing many different types of pharmaceutical and vitamin products. In addition to use as an oral dosage form for drugs and vitamins, soft gelatin capsules or softgels are also designed for use as suppositories for rectal or vaginal use. Other uses are for topical and ophthalmic preparations and the like. The cosmetic industry also uses softgels as a specialized package for various types of perfumes, oils, shampoos, skin creams and the like. Softgels are available in a great variety of sizes and shapes, including round shapes, oval shapes, oblong shapes, tube shapes and other special types of shapes such as stars. The finished capsules or softgels can be made in a variety of colors. Also, opacifiers may be added to the shell.

Although softgels can be made in a wide variety of shapes, sizes and colors, because of the wide range of use of softgels, there is a definite need to provide other means of identification. In this regard, it is quite common today to have an indicia of some type printed on each softgel after formation. The printing material may be any suitable dye or pigment. In some equipment, this has the disadvantage of requiring the use of an additional machine that will align the softgels and hold them in a desired oriented position for the application of the dye or ink. The use of additional equipment and procedural steps adds to the overall cost of manufacture of the softgels and, therefore, this system is considered disadvantageous. Also, the printing of each softgel can be done over only a limited portion of the exterior surface of the softgel and may not be readily read or even seen by the consumer. Specific examples of known processes and machines used for applying some type of identification on the softgels are those shown, for example, in Power (Posner) U.S. Pat. No. 2,449,139; Scherer U.S. Pat. No. 2,623,494; Scherer U.S. Pat. No. 2,688,775; Scherer U.S. Pat. No. 2,688,775; Taylor U.S. Pat. No. 3,124,840; Hansen U.S. Pat. No. 3,203,347; and Vincent U.S. Pat. No. 3,333,031.

The Posner Patent shows gelatin as one possible type of system that can be used in connection with an apparatus for manufacturing and filling capsules. In this patent, as seen best in FIG. 9 thereof, a tube of gelatin is formed and then a textured brand is applied to a portion of the outer surface of the tube. The capsule is then filled and sealed. This apparatus is used in quite a different system from the rotary die process which is probably the most common type of machine used for manufacturing softgels today. The rotary die process is described in some detail in Stanley's Chapter 13 of Lachman, Lieherman, and Kanig, *The Theory and Practice of Industrial Chemistry* (Copyright Lea & Febiger, 1970). In the rotary die process for manufacturing softgels, two gelatin ribbons are prepared, fed simultaneously to the fill area, and simultaneously and continuously filled, formed., hermetically sealed, and automatically cut between two rotary dies. The disclosure in the article by Stanley, as identified above, is incorporated into this specification by reference as being quite fully descriptive of the rotary die process, with which the present invention is involved, as opposed to the process disclosed in the Power patent.

The Scherer U.S. Pat. No. 2,623,494 relates to a banding machine for softgels. In this machine, the identifying band is applied to each individual capsule after the capsule is formed.

The Scherer U.S. Pat. No. 2,688,775 shows a method for applying a brand to the exterior surface of a gelatin capsule.

The Scherer U.S. Pat. No. 2,703,047 discloses a similar system of branding the filled capsules.

In the Taylor U.S. Pat. No. 3,124,840, a printing element is provided in order to print on the gelatin strip prior to the formation of the capsule.

The Hansen U.S. Pat. No. 3,203,347 shows a marking fluid that is printed on the gelatin ribbon used to make the softgels.

The Vincent U.S. Pat. No. 3,333,031 shows dying of the gelatin strip before capsule formation.

Even though efforts have been made to manufacture gelatin capsule and distinguish them from those of others by using different shapes, sizes, colors, color combinations, branding, banding, and printing, there still is a need to provide a way to even more uniquely identify one company's product from that of another while accomplishing this in a very unique, economical, and simplified manner.

SUMMARY OF THE INVENTION

It is therefore an important object of this invention to provide a unique process and apparatus by which softgels have a fully or partially texturized or patterned outer surface prepared in a highly economical way by applying a suitable texture to the outer surface of both ribbons, in a rotary die process and prior to softgel formulation, so that the softgels will be highly distinct from those manufactured by others and where the manufacturing process does not involve the use of additional equipment and processing steps of the type needed to mark, brand, print, or band previously formed capsules.

It is another object of the present invention to provide a unique method and apparatus which involves applying a suitable pattern or texture to the outer periphery of a gelatin ribbon used to form a softgel while the ribbon is still in a molten or flowable state so as to conveniently accept the addition of the desired texture or pattern.

It is still a further object of the present invention to provide an apparatus and process for applying a texture to one or both ribbons of gelatin used in the rotary die process used for making softgels wherein the apparatus is particularly economical in construction and the method utilized is particularly economical in use.

It is yet a further object of the present invention to provide a unique softgel capable of having a texture over its entire surface.

Further purposes and objects of the present invention will appear as the specification proceeds.

The foregoing objects are accomplished by providing a process and apparatus for manufacturing softgels having a patterned or textured surface; the process includes the steps of forming a flowable gelatin mass, providing a rotary drum having an outer surface, controllably directing the flowable gelatin mass to the outer surface of the drum, forming a gelatin ribbon of substantially uniform thickness on the outer surface of the drum, the ribbon being initially in a relatively softer or moldable state immediately following the directing step, providing a roller with a textured surface which is closely adjacent to the outer surface of the drum, passing the ribbon while in the relatively soft or moldable state between the drum surface and textured surface while applying sufficient pressure to the roller towards the drum for causing the textured surface to impart a matching texture on the outer surface of the ribbon, providing a second gelatin ribbon, forming a plurality of filled softgels from the gelatin ribbons while utilizing the conventional rotary die process for the manufacture of softgels, the matching texture defining the outer surface of at least a portion of the soft gels.

BRIEF DESCRIPTION OF THE DRAWINGS

One particular embodiment of the present invention is descriptively shown in the accompanying drawings wherein.

DETAILED DESCRIPTION OF THE PREFERRED EMBODIMENT

Figure 1:
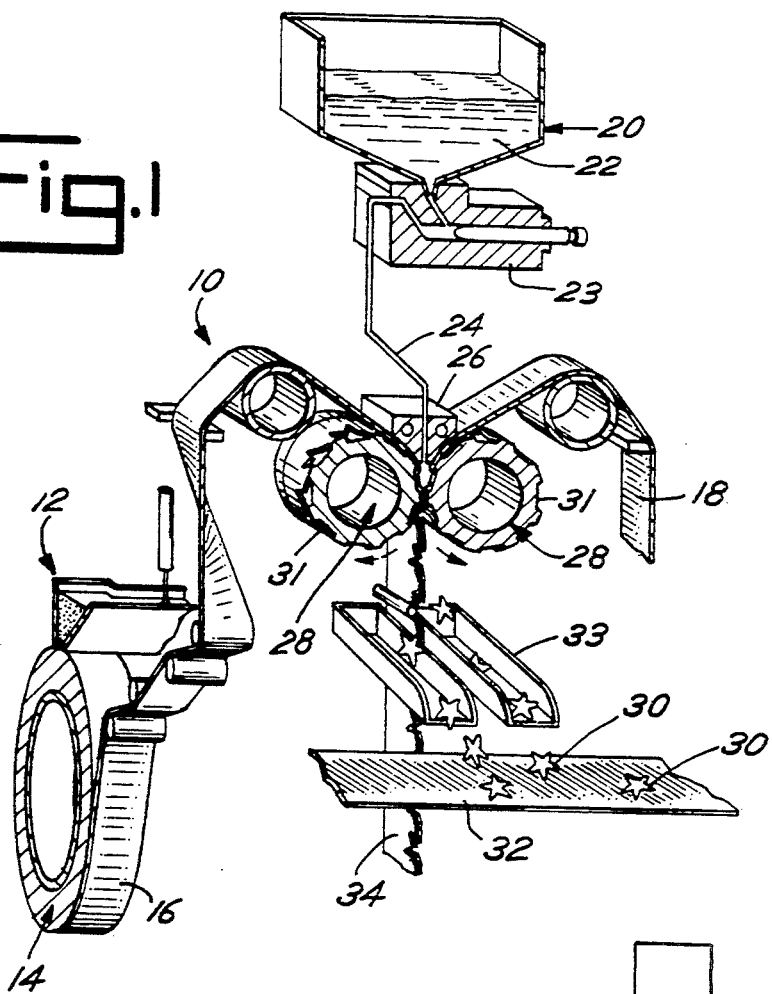
FIG. 1 is a schematic drawing showing the basic apparatus components of the rotary die process for making softgels.

The rotary die process machine, generally 10, is schematically illustrated in FIG. 1. The principal parts thereof include a gelatin metering device or spreader box, generally 12, and a gelatin ribbon casting and cooling rotary drum 14 upon which the first gelatin ribbon 16 is formed. For convenience in illustration, only one spreader box 12 and one rotary drum 14 are illustrated in FIG. 1. Since the rotary die process uses two gelatin ribbons, the second being designated as 18, it is to be understood that a similarly situated spreader box (not shown in FIG. 1) and rotary drum (not shown in FIG. 1) are utilized in connection with the formation of the second gelatin ribbon 18.

The rotary die process machine 10 further includes a tank 20, generally containing a liquid fill material which is any of a wide variety of substances both of an edible nature, such as vitamins and pharmaceuticals, or of an inedible nature, including oils, bath soaps, and the like. The fill material 22 contained in the tank 20 flows to a fill pump 23 which meters the volume of the fill material which passes through a line 24 to an injection wedge 26. The narrowed lower end of the wedge 26 is constructed and shaped to be located between a pair of rotary dies, generally 28, which contain matching die pockets 31. The rotary dies 28 rotate in the direction designated by the arrows 29 shown in FIG. 1. The fill material 22 passes through the filling wedge 26 into the space formed in the gelatin by the die pockets 31 formed by and between the rotary dies 28 where the softgels 30 are filled, shaped, hermetically sealed and cut from the gel ribbons 16 and 18 using conventional techniques. The filled capsules or softgels 30 which are formed are dropped into collecting chutes 33 where they fall down onto a conveyor 32. The gelatin net 34 which remains after the capsules 30 are cut is then passed on for collecting and reuse in a known manner.

Figure 7:
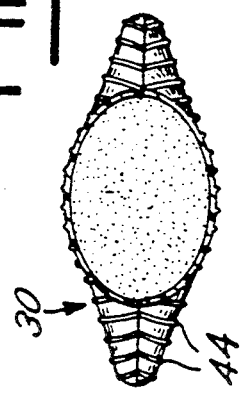
FIG. 7 is a sectional view taken along the line 7—7 of FIG. 6.

The rotary die machine 10, as described, is generally a conventional type of machine used for making gelatin capsules or softgels. Although there is nothing considered unique in the machine, as described above, it is, nevertheless, considered advantageous to have a full understanding of the rotary die process in order to have a full understanding of the overall process for manufacturing the capsules 30 which have the textured appearance as depicted in FIGS. 6 and 7. In FIG. 1, there is no illustration of the texturing apparatus, generally 36, which is used for applying the textured outer periphery to the outer surface of the gelatin ribbons 16 and 18 which have been formed on the rotary casting and cooling drums 14. The texturing apparatus 36 which is the general subject of the present invention, is best illustrated in FIGS. 2-5 herein. As stated previously, the disclosure of the rotary die process in Chapter 13 by Stanley, identified above, is incorporated herein by reference.

Figure 2:
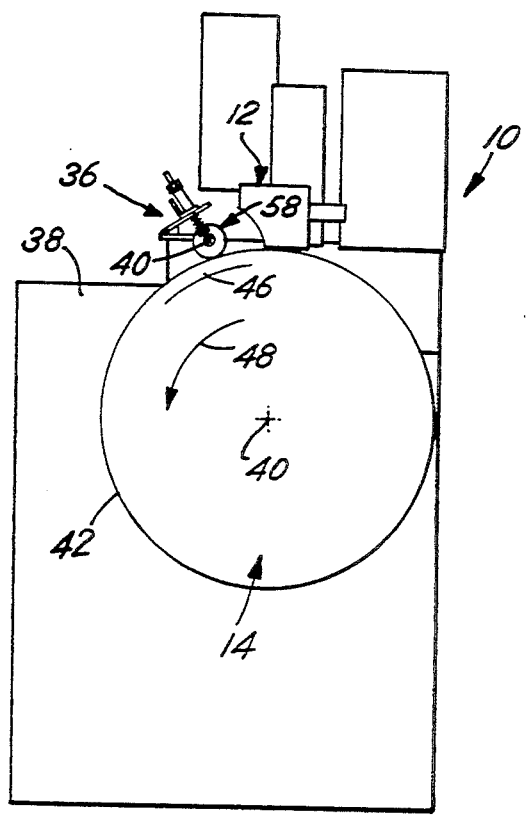
FIG. 2 is a side elevational view showing the portion of the rotary die process equipment, of the type schematically shown in FIG. 1 specifically locating the portion of the apparatus used to impart a texture to the outer periphery of the gelatin ribbon prior to capsule formation.
Figure 3:
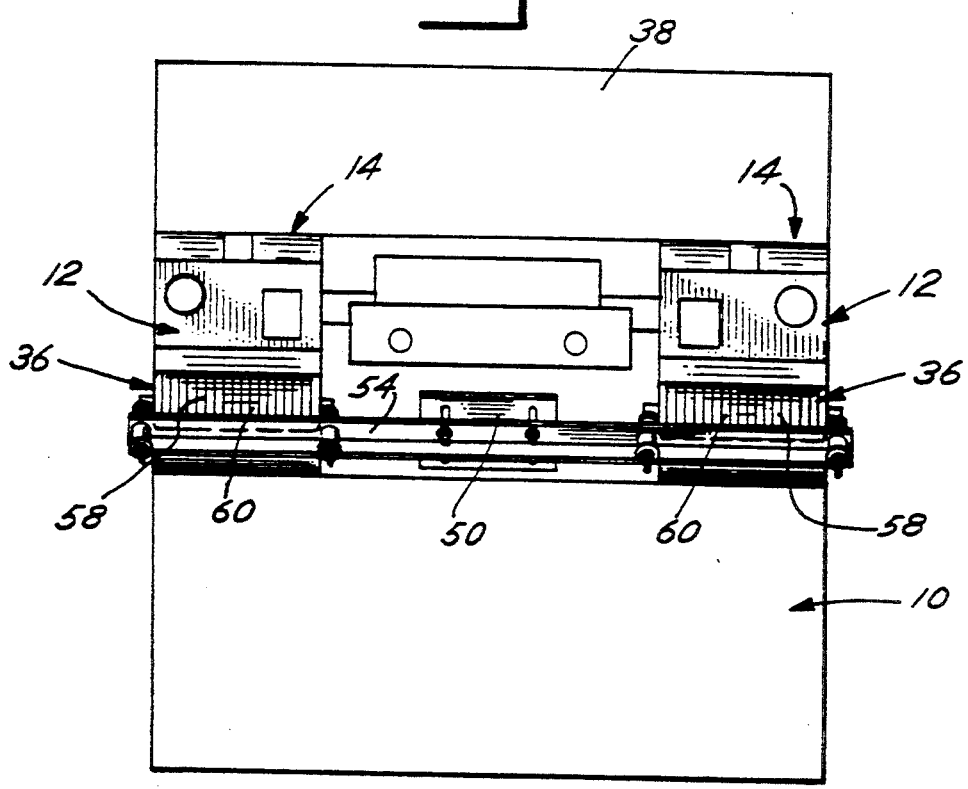
FIG. 3 is a top plan view of the apparatus depicted in FIG. 2.

Referring to FIGS. 2 and 3, the texturing apparatus 36 is shown in greater detail. A machine frame 38 is generally illustrated in FIG. 2, and the cooling and casting rotary drum 14 is rotatably mounted about its transverse axis 40. The texturing apparatus 36 is mounted closely adjacent and below the spreader box 12. Cylindrical outer surface 52 of the texturing apparatus 36 is placed sufficiently close to the spreader box 12 so that the gelatin ribbon 16 or 18 is formed on the outer peripheral surface 42 of the drum 14. The texturing apparatus 36 is positioned so that the ribbon 16 is in a suitable softened and moldable condition to have a suitable texture applied to its exterior surface, that is, the ribbon 16 should be sufficiently softened and moldable so as to accept the desired textured surface being applied thereto by the texturing apparatus 36. Referring to FIG. 6, it is seen that the outer surface of the capsule 30 has a texture of raised ribs 44 provided thereon. It is to be understood, however, that the texture for the capsules can vary over a wide range.

A texturing location is generally illustrated in the shaded area 46 as seen best in FIG. 2. This area represents a segment of up to approximately 45 degrees along the outer periphery of the drum 14 and extends from the lower, open end of the spreader box 12. If the texturing apparatus 36 is positioned beyond the texturing area 46, where the gelatin is applied to the outer periphery 42, it is unlikely that the ribbon 16 or 18 will accept a texture because the ribbon will have sufficiently hardened on the casting and cooling rotary drum 14, which rotates in the direction indicated by the arrow 48 in FIG. 2.

Figure 4:
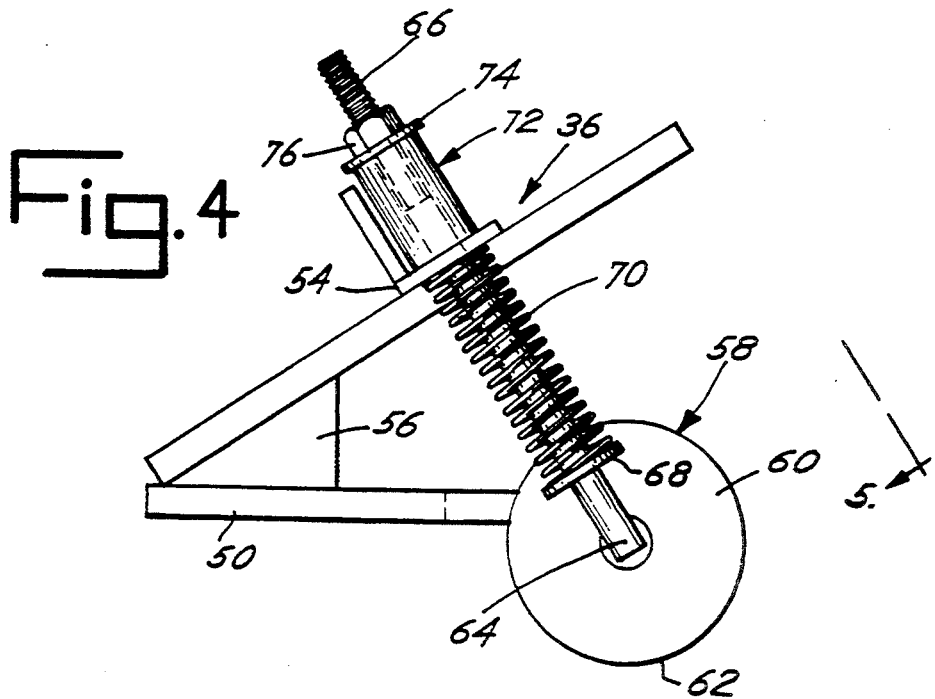
FIG. 4 is a detailed side elevational view of the texturing roller and the mounting therefor which is used to apply texture to the outer periphery of the gelatin ribbon.
Figure 5:
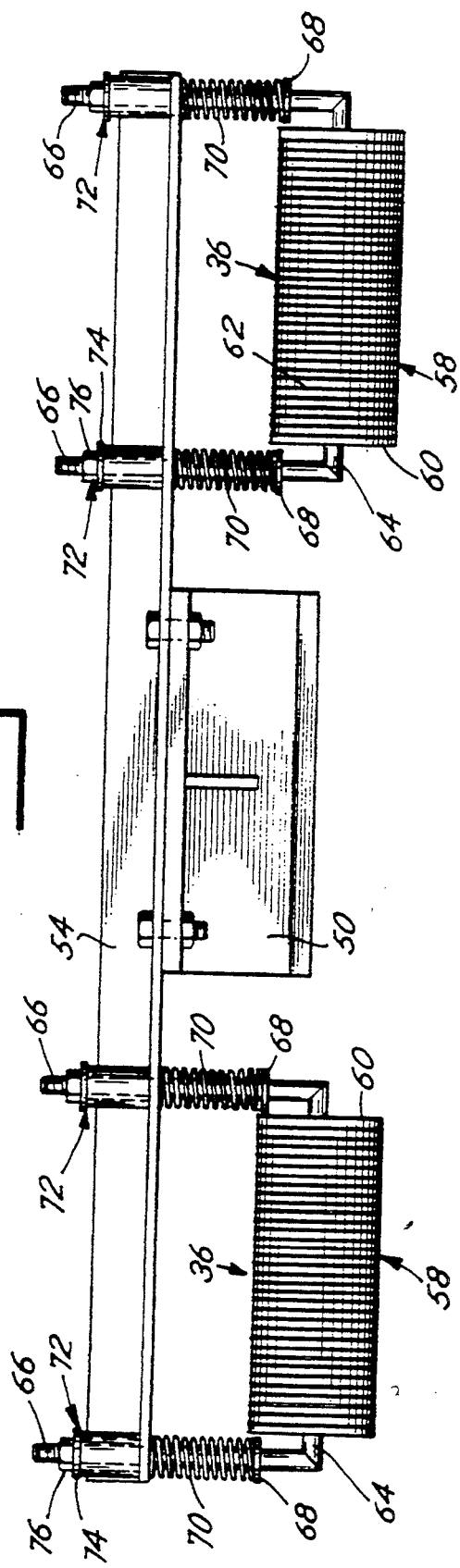
FIG. 5 is a view of the texturing apparatus depicted in FIG. 4, taken along the line 5—5.
Figure 6:
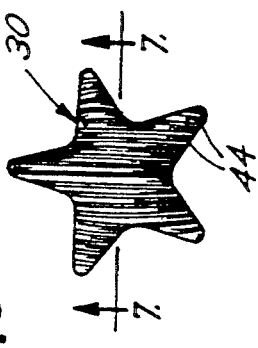
FIG. 6 is a top plan view of one type softgel upon which a textured surface has been imparted by the use of the apparatus as shown in FIGS. 1-5.

Referring to FIGS. 3-5, the texturing apparatus 36 will be described in greater detail. As seen in FIG. 5, a base plate 50 is mounted on the frame 38 of the rotary die process machine 10. A cross support 54, as best seen in FIGS. 4 and 5, is mounted on the base plate 50 at a preseleeted angle. An upright angled rib 56 angularly mounts the cross support 54 to the base plate 50. The cross support 54 is elongated and at its opposite ends, has a texturing roller assembly 58 operatively mounted at either end thereof for the texturing of each ribbon 16 and 18. The roller assembly, generally 58, includes an elongated roller 60 having a textured outer periphery 62. The roller 60 is approximately the same width as the drum 14 and is rotatable about the transverse axis 64 which is parallel to the axis 40 of the rotary casting and cooling drums 14. Each roller 60 is biased or spring mounted towards the drum 14.

The axis 64, of each roller assembly 60, has the outer ends thereof interconnected to a threaded rod 66. Each threaded rod 66 is substantially transverse or perpendicular to the axis 64. A retaining washer 68 is mounted on the lower end of each of the threaded rods 66. A compression spring 70 is positioned between the retaining washer 68 and the cross support 54 in such a way that the springs 70 are biased to apply pressure in a radial direction, forcing the roller 60 and its peripheral textured surface 62 towards or against the outer peripheral surface 42 of the casting drum 14.

Desirably, the pressure applied by the spring 70 is adjustable by the adjusting assembly, generally 72, located at the upper end of each of the threaded rods 66. Desirably, a spacer 74 is mounted between the cross support 54 and the upper retaining washer 74. An adjustment nut 76 is threadably mounted at the upper end of the threaded rod so that by adjusting the nut 76 along the length of the threaded rod 66, the desired amount of pressure can be applied by the spring 70 so the outer textured surface 62 of the roller 60 bears towards the outer surface 42 of the rotary drum 14 with the ribbon 16 or 18 therebetween.

In practicing the process for imparting the desired texture to the outer periphery of the ribbons 16 and 18, so that a textured outer periphery is provided on the capsules 30, attention is directed to the drawings. The spreader box 12 is filled with a molten, flowable gelatin of a conventional formulation well known to those skilled in the art. The shell formulation, generally comprising water, gelatin and a plasticizer passes through the spreader box and is applied initially in liquid form against the outer periphery of the rotating cooling and casting drum 14. The gelatin sheet or ribbon of suitable thickness is desirably placed against the outer surface of the drum 14 and upon counterclockwise direction of the drum 14, as viewed in FIG. 2, in the direction of the arrow 48, the texturing apparatus immediately comes into contact with the outer periphery of the gelatin ribbon 16 while it is still in a flowable, or moldable condition.

It is to be understood that the specific condition of the amount of pressure applied by the texturing roll against the outer periphery of the ribbon is dependent upon an operator of ordinary skill in the art who is well capable of setting up the equipment in the proper manner. This is considered to be well within the skills of one of ordinary skill in the art and is dependent upon a variety of factors, including the nature of the shell formulation, ambient conditions, the temperature of the rotary drum 14, and the desired thickness to be imparted to the ribbon 16, which is dependent upon its end use. Desirably, the outer periphery of the roller 60 has a lubricant, such as mineral oil, applied, by suitable means, such as a brush (not shown), to its outer surface, in order to assure that there is no sticking of the gelatin ribbon to the texturing roller 60 once the texture has been applied thereto. The operator adjusts the pressure of roller 60 as the ribbon passes between the outer textured surface 62 of the roller assembly 58 and the outer peripheral surface 42 of the casting drum 14.

As seen in FIG. 1, and as previously described, once the ribbon has been formed with the desired texture thereon, it passes around to the rotary dies 28 with the wedge 26 therebetween for directing the fill 22 into the space between the two ribbons 16 and 18 as they come together between the rotary dies 28.

The capsules 30 thus formed are as illustrated in FIG. 6. In this particular capsule, shown in FIG. 6, the capsule 30 has the shape of a star and the texture on the outer surface thereof has raised ribs which are complementary to the peripheral grooves that are located on the outer periphery of the textured surface 62 of the roller 60. In the present invention, it is important to have the capability of providing a texture over the entire softgel periphery, which was not possible with the prior art techniques. Also, it is to be understood that, in certain applications, the textured surface can define the inner surface of the shell capsule as opposed to the outer surface thereof. It is thus believed that all objects previously set Forth have been accomplished.

While in the foregoing there has been provided a detailed description of one particular embodiment of the present invention, it is to be understood that all equivalents obvious to those of ordinary skill in the art be included within the scope of the invention as claimed.

What is claimed is:

1. A capsule comprising a soft gelatin shell having an outer surface and a fill material within said soft gelatin shell, said outer surface having a predetermined, repeatable and tactile pattern over at least a portion thereof.

2. A capsule as claimed in claim 1 wherein said pattern is embossed upon the entirety of said outer surface.

3. A capsule comprising a soft gelatin shell, molded in a rotary die and having a predetermined, repeatable and tactile outer surface formed by engagement with a patterned drum prior to said rotary die, and a fill material contained therein.

4. A capsule comprising:
    a soft gelatin shell molded from first and second gelatin ribbons in a rotary die, at least one of said first and second gelatin ribbons having a predetermined, repeatable and tactile outer surface formed by engagement with a patterned drum prior to entry into said rotary die; and
    a fill material contained within said soft gelatin shell.

5. A capsule as claimed in claim 4 wherein both of said first and second gelatin ribbons are embossed with said predetermined, repeatable and tactile outer surface.

* * * * *